United States Patent
Fassiau et al.

(10) Patent No.: US 7,759,458 B2
(45) Date of Patent: Jul. 20, 2010

(54) PROCESS FOR THE PURIFICATION OF VINYL CHLORIDE POLYMERS (PVC) FROM HEAVY METALS

(75) Inventors: Eric Fassiau, Brussels (BE); Jean-Christophe Lepers, Ottignies (BE); Michaël Lannoy, Hamois (BE)

(73) Assignee: Solvay (Societe Anonyme), Brussels (BE)

( * ) Notice: Subject to any disclaimer, the term of this patent is extended or adjusted under 35 U.S.C. 154(b) by 351 days.

(21) Appl. No.: 11/719,714

(22) PCT Filed: Nov. 21, 2005

(86) PCT No.: PCT/EP2005/056108
§ 371 (c)(1),
(2), (4) Date: May 18, 2007

(87) PCT Pub. No.: WO2006/053907
PCT Pub. Date: May 26, 2006

(65) Prior Publication Data
US 2009/0203868 A1    Aug. 13, 2009

(30) Foreign Application Priority Data
Nov. 22, 2004  (FR) .................................. 04 12360

(51) Int. Cl.
*C08F 6/00*  (2006.01)
*C08J 3/00*  (2006.01)

(52) U.S. Cl. ...................... 528/502; 525/199; 525/267; 525/268; 525/269; 526/343; 526/344

(58) Field of Classification Search ................. 525/199, 525/268, 267, 269; 526/343, 344; 528/502 D
See application file for complete search history.

(56) References Cited

U.S. PATENT DOCUMENTS

| 2,538,091 | A | * | 1/1951 | Finlayson et al. ........... 524/360 |
| 2,915,482 | A |   | 12/1959 | Nagle et al. |
| 5,476,591 | A | * | 12/1995 | Green ........................ 210/638 |
| 5,674,914 | A |   | 10/1997 | Abe et al. |

| 2005/0010027 | A1 |   | 1/2005 | Vandenhende et al. |
| 2005/0077640 | A1 |   | 4/2005 | Fassiau et al. |
| 2006/0173085 | A1 |   | 8/2006 | Fassiau et al. |
| 2006/0173086 | A1 |   | 8/2006 | Fassaiau et al. |
| 2006/0194913 | A1 |   | 8/2006 | Pleska et al. |
| 2009/0149619 | A1 | * | 6/2009 | Fassiau et al. ............... 526/344 |

FOREIGN PATENT DOCUMENTS

| EP | 0 945 481   | 9/1999 |
| EP | 1232204     | 8/2002 |
| EP | 1268628     | 1/2003 |
| EP | 1456281     | 9/2004 |
| FR | 2857669     | 1/2005 |
| FR | 2857670     | 1/2005 |
| FR | 2 868 782   | 10/2005 |
| JP | 2000 285756 | 10/2000 |
| WO | 02 085523   | 10/2002 |
| WO | 2005 100461 | 10/2005 |

OTHER PUBLICATIONS

U.S. Appl. No. 12/063,710, filed Feb. 13, 2008, Fassiau, et al.
Van Krevelen, D. W., "Properties of Polymers", pp. 200-202, 1990 edition.
Brandrup, J. et al., "Polymer Handbook", pp. IV-337 and IV-359, Second Edition.
U.S. Appl. No. 11/578,347, filed Oct. 12, 2006, Vandenhende.
U.S. Appl. No. 11/578,522, filed Oct. 16, 2006, Vandenhende, et al.
U.S. Appl. No. 11/719,825, filed May 21, 2007, Fassiau, et al.
U.S. Appl. No. 11/719,255, filed May 14, 2007, Vandenhende.
U.S. Appl. No. 11/719,714, filed May 18, 2007, 2009/0203868 A1, Fassiau et al.
U.S. Appl. No. 12/677,906, filed Mar. 12, 2010, Lepers et al.

* cited by examiner

*Primary Examiner*—Terressa M Boykin
(74) *Attorney, Agent, or Firm*—Oblon, Spivak, McClelland, Maier & Neustadt, L.L.P.

(57) ABSTRACT

A process for the purification of a vinyl chloride polymer containing a compound of a heavy metal by:
(a) dissolving the PVC in a solvent;
(b) treating the solution with at least one additive capable of adsorbing or of forming a complex with the compound of the heavy metal;
(c) centrifuging the treated solution to precipitate the adsorbed or complexed compound of the heavy metal; and
(d) separating the precipitate from the PVC solution.

12 Claims, No Drawings

PROCESS FOR THE PURIFICATION OF VINYL CHLORIDE POLYMERS (PVC) FROM HEAVY METALS

This application is a 371 of PCT/EP05/56108, filed Nov. 21, 2005.

The present invention relates to a process for the purification of vinyl chloride polymers (PVC) from heavy metals (mainly Pb and Cd) and more particularly to a process for the recycling of PVC-based articles comprising heavy metal compounds.

These polymers are widely used in the manufacture of varied flexible or rigid articles, such as, for example, tarpaulins, coated fabrics and other components for the interior trim of vehicles, pipes, window frames or electrical cables possessing polymeric insulation.

However, heavy metals are the subject of increasingly strict environmental laws targeted at limiting/banning the use thereof in an increasing number of applications. As regards the plastics sector and in particular PVC, constantly changing legislation is targeted at limiting the content of Pb and Cd therein.

In point of fact, the majority of former and current waste based on PVC has contents of Pb or of Cd which are typically of the order of (some tens of) thousands of ppm, which is beyond the target (at least for the future). In order to be able to be reused in a future application, the recycled PVC resins resulting from these types of waste will thus have to be treated so as to drastically reduce the content of heavy metals thereof.

Patent Application JP 2000-285756 provides a method for the removal of Pb from PVC solutions, according to which the said solution is subjected to centrifuging. However, the Application Company has found that this method, by itself alone, did not make it possible to achieve a high level of purity.

Consequently, the present invention is targeted at providing a process for the recycling of PVC which is more effective in removing heavy metals.

More specifically, the present invention relates to a process for the purification of a vinyl chloride polymer (PVC) comprising at least one compound of a heavy metal, according to which:
(a) the PVC is dissolved in a solvent;
(b) the solution is treated with at least one additive capable of adsorbing or of forming complexes with the compound of the heavy metal;
(c) the solution treated is subjected to centrifuging, so as to precipitate the adsorbed or complexed compound of the heavy metal; and
(d) the precipitate is separated from the PVC solution.

The PVC which can be treated by the process according to the invention can result from articles of any nature, provided that they comprise PVC and heavy metal compounds.

These articles can exist in any form, for example in the form of granules, of powder, of flexible or rigid pipes, of containers, of sheets for the covering of soils, of tarpaulins, of window frames, of insulating sleeves for electrical cables, and the like. They may have been manufactured by any known technique: extrusion, coating, injection moulding, and the like.

The articles do not necessarily have to exist in the form of objects exhibiting a well defined form; the process also applies to articles in the liquid or pasty state, in particular to sludges collected during the cleaning of plants used for the manufacture of articles starting from vinyl plastisols. In addition to one or more vinyl chloride polymers, these articles in the liquid or pasty state can also comprise one or more solvents, for example white spirit.

A stage preliminary to the process according to the invention consists, if necessary, in shredding the articles so as to reduce them to fragments of reduced size (for example of less than 2 cm) which are easy to handle. This shredding can be carried out using any appropriate device, for example using a rotary knife mill or a shear mill. It is clear that, if the article already exists in the form of fragments of appropriate dimensions, the shearing stage is superfluous. In some cases, it may be useful to subject the fragments of articles thus obtained to an intermediate separating stage which makes it possible to remove, by conventional techniques, such as flotation or electrostatic separation, possible constituents other than PVC.

According to the invention, the PVC resulting from these articles is subjected to the action of an appropriate solvent capable of dissolving it. This dissolution can be carried out in any appropriate device, taking into account safety and environmental requirements in particular, for example in a closed reactor exhibiting satisfactory chemical resistance. The reaction medium is preferably stirred. In order to avoid possible reinforcing components/contaminants (for example metal ones in the case of cable waste) from hanging on to the stirring means and interfering with the operation thereof, an advantageous alternative form consists in carrying out the dissolution in a vessel in which a perforated rotating drum is positioned, which drum rotates at a moderate speed (preferably at less than 100 rev/min), and/or in removing the said reinforcing components/contaminants by filtration or any other appropriate means before the treatment for the purification of the solution from heavy metals. These techniques can also be applied in the case where articles comprising polymer(s) other than PVC, which is (are) insoluble in the chosen solvent, would be directly treated.

The term "PVC" is understood to denote any homo- or copolymer comprising at least 50% by weight of vinyl chloride (VC). Use is generally made of poly(vinyl chloride) (PVC homopolymer) or a copolymer with vinyl acetate or any other appropriate monomer. In addition to one or more VC polymers, the articles can also comprise one or more conventional additives, such as, for example, plasticizers, antioxidants, flame retardants, pigments, fillers, and the like, including reinforcing fibres, for example fibres of glass or of an appropriate plastic, such as a polyester.

The term "heavy metal compounds" is understood to mean the compounds of metals which are subject to regulations, in particular as regards their discharge to the environment: As, Cd, Cr, Hg, Pb, and the like. In the context of the invention, it is the organic and inorganic compounds of Pb and of Cd which are the most widely used in PVC formulations. These compounds can be used in PVC as pigments, stabilizing agents, and the like, and other conventional additives. The present invention gives excellent results with Pb and Cd compounds.

The solvent (substance capable of dissolving PVC) is preferably chosen from the liquids having a solubility parameter (a definition of which and experimental values for which appear in "Properties of Polymers", D. W. Van Krevelen, 1990 edition, pp. 200-202, and in "Polymer Handbook", J. Brandrup and E. H. Immergut, Editors, Second Edition, p. IV-337 to IV-359) close to that of PVC and/or exhibiting strong interactions with the latter. The term "close" is generally equivalent to "not differing by more than 6 units". The solvent is generally an organic solvent, preferably a polar organic solvent, such as cyclohexanone, methyl ethyl ketone (MEK), methyl isobutyl ketone and tetrahydrofuran. MEK gives good results.

The dissolution of the PVC is carried out under a pressure determined by the temperature. Generally, it is preferable to operate under hot conditions and under pressure, that is to say at a temperature and a pressure which are greater than the ambient values. The temperature can reach, indeed even exceed, 100° C., indeed even 120° C. Generally, the associated pressure is at least 2 bar, indeed even at least 4 bar. Advantageously, the pressure does not exceed 10 bar.

In addition, it is advantageous to operate under an inert atmosphere, for example under nitrogen, in order to avoid any risk of explosion and of decomposition of the solvent.

The amount of solvent to be used must be chosen so as to prevent the increase in viscosity brought about by the dissolution of the PVC from interfering with the satisfactory progression of the process (filtration, and the like). In the process according to the invention, one can generally work with polymer concentrations higher or equal to 100 g/l of solvent, even to 250 g/l and even, 300 g/l. However, the polymer content does not typically exceed 500 g/l, even 400 g/l.

According to the invention, once the PVC has dissolved, the solution is treated with at least one additive capable of adsorbing or of forming complexes with at least a portion of the heavy metal compound. Additives capable of adsorbing the said compounds are generally solids having surface properties such that the heavy metal compounds are adsorbed at their surface. Magnetite ($Fe_3O_4$) and some organic crystals, such as the crystalline acidic form of EDTA (ethylenediaminetetraacetic acid), give good results. Compounds capable of forming complexes with heavy metal compounds are chelating agents. The sodium salts of EDTA (NaEDTA, $Na_2$EDTA, $Na_4$EDTA and more particularly $Na_3$EDTA) give good results as regards the removal of Pb compounds in particular. Other chelating agents which are advantageous in the context of the invention are composed of polymeric chelating agents (poly(acrylic acid)s, for example).

The additives mentioned above (adsorbents, chelating agents) are generally introduced into the PVC solution either in the particulate form, dispersed in the solution (magnetite), or in the form of an aqueous suspension (EDTA) or of an aqueous solution ($Na_3$EDTA), mixed with the solution. In this case, the water (which is a nonsolvent for PVC and which is generally not very miscible with the solvents for PVC) is preferably introduced in an amount such that the polymer solution remains single-phase. In the case of the aqueous solutions/suspensions of the additive, it may be advantageous to heat them to the boiling point of the water. In the case of the chelating agents, the pH of the solution generally has an effect on the result obtained. With $Na_3$EDTA in particular, a slightly basic pH (of between 7.5 and 9.5, for example, and even between 8 and 9) gives good results.

The temperature and the amount of additive (adsorbent/chelating agent) are to be adjusted so as to optimize the result obtained. Generally, a higher content of additive and a higher temperature promote the reaction with the heavy metal compounds. As with the dissolution, the pressure of the treatment with the additive is generally conditioned by the temperature. The duration of the reaction has to be sufficient for the latter to be substantially complete. It is generally at least a few minutes, indeed even at least 1 hour. Preferably, the extraction takes place with stirring. Good results have been obtained with a stirrer of propeller type in a reactor equipped with baffles (2 to 4) which rotates at several hundred revolutions/min (rpm) (typically at more than 300 rpm, indeed even at more than 400 and even than 500 rpm) and which brings about turbulent conditions throughout the reactor.

Before centrifuging the solution treated with the additive (adsorbent/chelating agent), it may prove to be advantageous to allow it to separate by settling for at least a few minutes at ambient temperature or slightly above ambient temperature (between 40 and 60° C., for example).

The centrifuging of the solution separated by settling can be carried out in any suitable device which allows a force of at least 100 g (g being the force of gravitational attraction), indeed even of at least 400 g, indeed even of at least 650 g, to be applied to it.

Subsequent to this operation, generally, the adsorbed/chelated compounds have precipitated and are found in the bottom of the vessel containing the dissolved PVC solution. The supernatant solution can then be separated from the precipitate in any appropriate way.

Each of the 2 fractions can subsequently be subjected to an appropriate treatment. The precipitate can, for example, be dried and/or be subjected to a treatment for regeneration of the additive.

With regard to the solution, it is advantageously subjected to a treatment for precipitation of the purified PVC, and this may be achieved by any appropriate means. However, it is advisable for the solution to be purified to the desired level before precipitation of the PVC. In point of fact, the Applicant Company has found that the process described above appears to give best results in the case of inorganic compounds of heavy metals and in particular of Pb. Consequently, in the event of the PVC article to be recycled also or alternatively comprising organic compounds of these metals and in particular of Pb (for example stearates), it is advantageous first to convert these compounds into inorganic compounds using an appropriate reaction. Thus, for example, they can be reacted beforehand with an acid or a base (respectively HCl or $HNO_3$ and NaOH, for example), so as to convert them into the corresponding salt or hydroxide (respectively $PbCl_2$ and $Pb(OH)_2$). This reaction is thus carried out before the stage (b) of treatment of the solution with the additive.

In addition, the Applicant Company has found that, in some cases (depending on the nature of the heavy metal compounds and/or the treatment conditions), the purity of the solution on conclusion of the process according to the invention can be further improved, this being achieved by liquid-liquid extraction of the said solution using an aqueous phase comprising an appropriate extracting agent (preferably NaOH or polyphosphates (Na polytriphosphate (NaPTP) or hexametaphosphates) or other dispersing agents). This aspect forms the subject-matter of a copending application on behalf of the Applicant Company. Preferably, this liquid-liquid extraction is carried out on the solution resulting from stage (d) described above and, in a very particularly preferred way, two successive extractions are carried out, each with a different reagent. Consequently, according to one alternative form, the present invention relates to a process as described above where the solution resulting from stage (d) is subjected either to one liquid-liquid extraction using an aqueous solution comprising NaOH or polyphosphates (NaPTP or hexametaphosphates) or other dispersing agents, or to two successive liquid-liquid extractions, each with one of the abovementioned reagents, this taking place before optional precipitation of the PVC. The NaOH/NaPTP sequence with intermediate precipitation of the PVC is particularly advantageous.

Once the solution has been purified to the level thus desired, the PVC is precipitated therefrom. Preferably, this precipitation takes place by addition of a nonsolvent (preferably water) at least partially in the form of vapour (in order to carry out an azeotropic distillation of the solvent), this being such as disclosed in Patents EP 0 945 481 and 1 232 204 on behalf of the Applicant Company. Various improvements to this process, also patented by the Applicant Company, can be applied (recourse to a phase separation agent: EP 1 268 628;

recourse to a mixture of dispersing agents: Patent Application FR 03/08690; prior addition of liquid water in order to achieve phase inversion: FR 03/08691; removal of the phase separation agent before precipitation: FR 04101559.5).

It is necessary, in this context, for the solvent used to be miscible with water and to form an azeotrope with water. The solvent is advantageously chosen from cyclohexanone, methyl ethyl ketone (MEK), methyl isobutyl ketone and tetrahydrofuran. It is preferable to use MEK, which forms, with water, an azeotrope comprising (at atmospheric pressure) 11% of water and 89% of MEK (by weight). On conclusion of the azeotropic distillation, the polymer particles (agglomerates) can be easily collected, for example by filtration of the water-particles mixture, and optionally dried before being stored or reused. The residual water is advantageously purified in order to remove therefrom the dissolved constituents, such as emulsifiers or others.

Alternatively to the azeotropic distillation, the PVC can be recovered by atomization or devolatilization of the solution, as claimed respectively in Patent Applications EP 1 456 281 and FR 04/03856, also on behalf of the Applicant Company.

The technical content of all the abovementioned patent applications is incorporated by reference in the present patent application.

Given the cost of the solvent involved in the process according to the invention and the disadvantages which would be presented by its discharge to the environment, it is desirable to recycle it on conclusion of the precipitation/atomization/devolatilization stage. The way in which this recycling is carried out is disclosed in the abovementioned corresponding patent applications.

The process according to the invention can be carried out continuously or batchwise, this being essentially according to the method chosen for separating the precipitate (of heavy metals) from the PVC solution.

One advantage of the process according to the invention is that it often (depending on the nature of the additive chosen) also makes it possible to depigment the PVC to be recycled. Thus, for example, the Applicant Company has found that carbon black, pigments and fillers were generally removed at the same time as the heavy metal compounds (lead and cadmium compounds in particular) in an approximately proportional manner (the intensity of the decoloration being as it were proportional to the quality of the purification from Pb and Cd).

Another important advantage of the process according to the invention is that it can operate in a closed loop, without generating contaminating discharges, given that both the solvent, on the one hand, and the adsorbent/chelating agent and the optional other additives used (phase separation agent, for example), on the other hand, can be recycled and reused in the process. In this case, in practice, the solvent used in the dissolution stage is rarely pure; it can in particular comprise a certain amount of nonsolvent (preferably, however, insufficient to bring about the appearance of a second phase), of phase separation agent, and the like, or of any other reagent/additive used in the process. Likewise, the nonsolvent optionally used for the precipitation (optionally at least partially in the vapour form) can comprise a small amount of solvent (and, for example, can have a composition close to or identical to that of the azeotropic composition).

The process according to the invention is illustrated in a nonlimiting manner by the following examples, the experimental details of which and the results of which obtained appear in the table below.

All these examples were carried out according to the same procedure, namely:

250 g fractions of PVC (resulting from cable factory waste and comprising approximately 2500 ppm of Pb (present in particular in the form of tribasic lead sulphate and optionally of lead stearate), along with carbon black, plasticizer (DOP or DIDP), fillers ($CaCO_3$), lubricants, and the like) were each dissolved in 2500 g of solvent (composed to 80% of MEK, to 5% of water and to 15% of hexane) in order to form solutions, which solutions were subjected to extraction using one of the following reagents, employed in a proportion of 25 g per 250 g of PVC (i.e., at a ratio by weight of 0.1 of the additive to the PVC):

EDTA in its crystalline acidic form in suspension in water at the boiling point of the water;

$Na_3EDTA$ in the form dissolved in an aqueous solution with a pH of 8.5;

magnetite ($Fe_3O_4$).

The extraction took place while stirring with a stirrer of propeller type in a reactor equipped with baffles (2 to 4) which rotates at 600 rpm and which brings about turbulent conditions throughout the reactor.

The reaction temperature and the reaction time appear in the table.

The solutions thus treated were collected in 250 ml centrifuge pots at a temperature of 45-50° C.

A centrifugal force was applied to them, the intensity of which (varying according to the radius of gyration of the pots) and the duration of which appear in the table. On conclusion of this centrifuging, the appearance of a precipitate at the bottom of the pots was observed.

The supernatant solutions were collected in round-bottomed flasks and the solvent was evaporated therefrom in order to recover the PVC in the form of plastic films which were analyzed by X-ray fluorescence in order to quantitatively determine the Pb residues thereof.

| Reagent | Reaction | | Centrifugation | | Res. [Pb] | |
| --- | --- | --- | --- | --- | --- | --- |
| | Time | T ° | Duration | g | g/kg | Depigm. |
| None | NA | NA | 60 s | 112-224 | 1.32 | None |
| $Fe_3O_4$ | 60 min | 100° C. | 60 s | 112-224 | 0.29 | Slight |
| EDTA | 60 min | 100° C. | 60 s | 112-224 | 0.06 | Very good |
| $Na_3EDTA$ | 60 min | 100° C. | 60 s | 112-224 | 0.04 | None |
| EDTA | 60 min | 113° C. | 60 s | 112-224 | 0.03 | Very good |

The invention claimed is:

1. A process for the purification of a vinyl chloride polymer (PVC) containing a compound of a heavy metal, comprising:
    (a) dissolving the PVC in a solvent to form a PVC solution;
    (b) treating the PVC solution with at least one additive capable of adsorbing or of forming a complex with the compound of the heavy metal to form a treated solution comprising an adsorbed or complexed compound of the heavy metal;
    (c) centrifuging the treated solution to precipitate the adsorbed or complexed compound of the heavy metal; and
    (d) separating the precipitated adsorbed or complexed compound of the heavy metal from the treated solution.

2. The process according to claim 1, in which the solvent is chosen from cyclohexanone, methyl ethyl ketone (MEK), methyl isobutyl ketone and tetrahydrofuran.

3. The process according to claim 1, in which the additive is magnetite ($Fe_3O_4$) in particulate form, which is dispersed in the PVC solution.

4. The process according to claim 1, in which the additive is EDTA (ethylenediaminetetraacetic acid) in crystalline acidic form in suspension in water.

5. The process according to claim 1, in which the additive is an aqueous solution of a sodium salt of EDTA.

6. The process according to claim 4, in which the water is introduced in an amount so that the PVC solution remains single-phase.

7. The process according to claim 4, in which the suspension/solution is heated to the boiling point of the water.

8. The process according to claim 5, in which the pH of the aqueous solution is between 7.5 and 9.5.

9. The process according to claim 1, in which, before treatment of the PVC solution with the additive, the PVC solution is reacted with an acid or a base.

10. The process according to claim 1, further comprising subjecting separated treated solution resulting from (d) to one liquid-liquid extraction with an aqueous solution comprising NaOH or a polyphosphate, or to two successive liquid-liquid extractions, each with an aqueous solution comprising NaOH or a polyphosphate.

11. The process according to claim 1, in which the solvent is capable of forming an azeotrope with water and in which the separated treated solution resulting from (d) is subjected to injection of water vapor, bringing about the azeotropic distillation of the solvent and the precipitation of the PVC.

12. The process according to claim 10, in which the solvent is capable of forming an azeotrope with water and in which the solution resulting from the liquid-liquid extraction is subjected to injection of water vapor, bringing about the azeotropic distillation of the solvent and the precipitation of the PVC.

* * * * *